May 15, 1956 W. V. SCHMIDT 2,745,306
ADJUSTABLE TOOL HOLDER
Filed April 26, 1951 5 Sheets-Sheet 1

Walter V. Schmidt
INVENTOR.

BY *Clarence A. O'Brien*
*and Harvey B. Jackson*
Attorneys

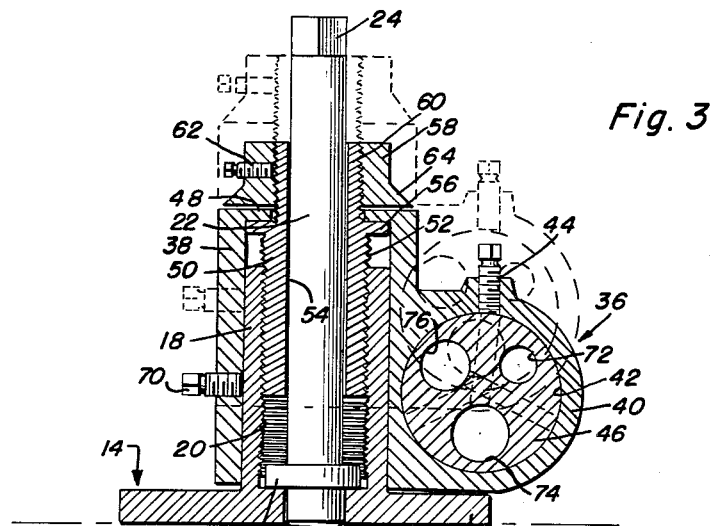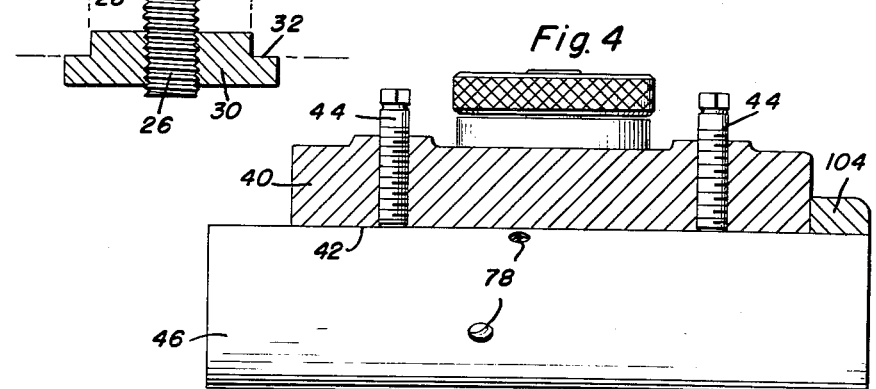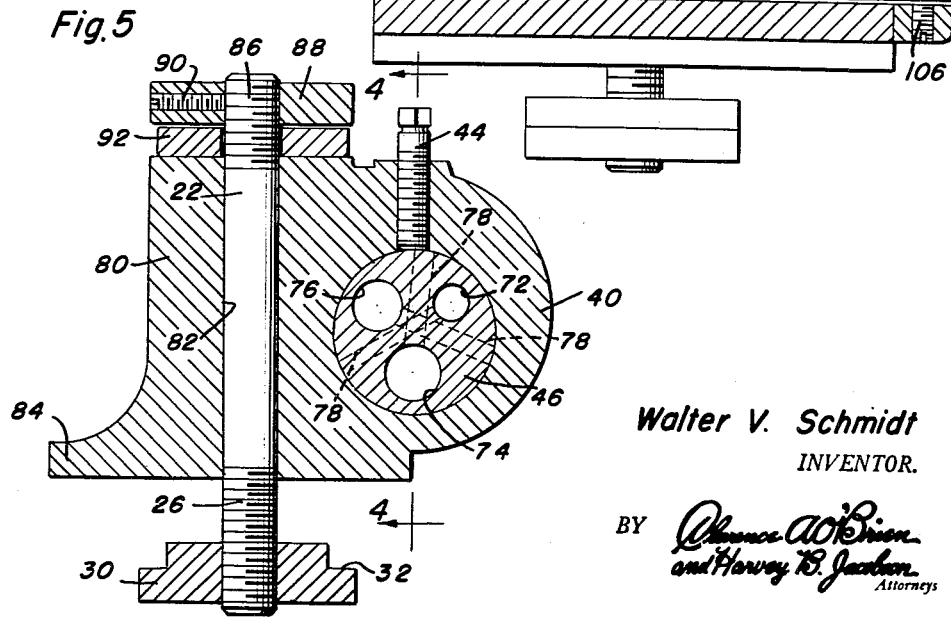

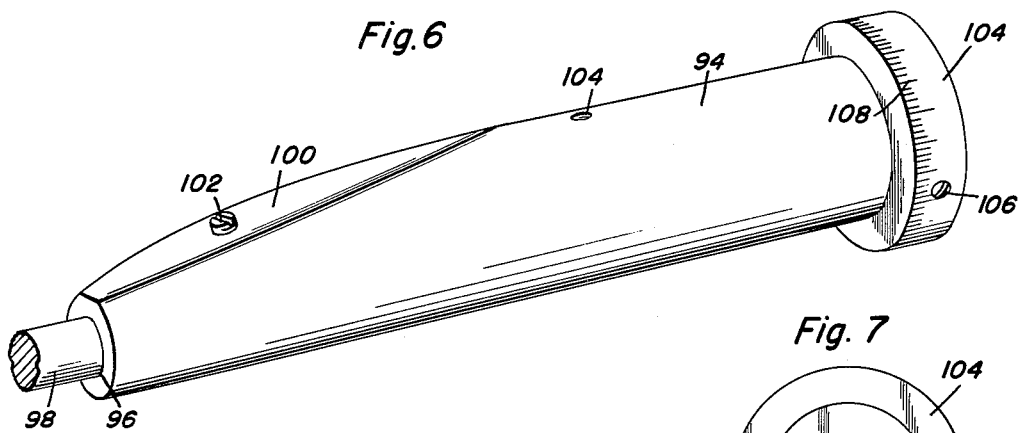
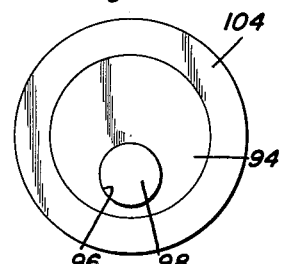
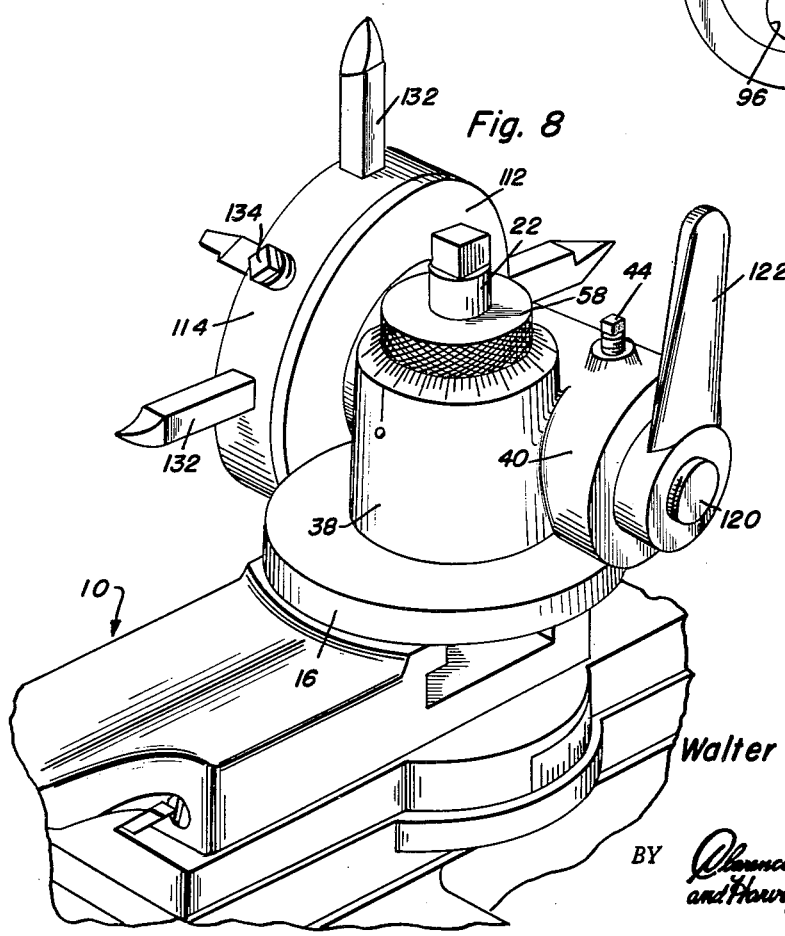

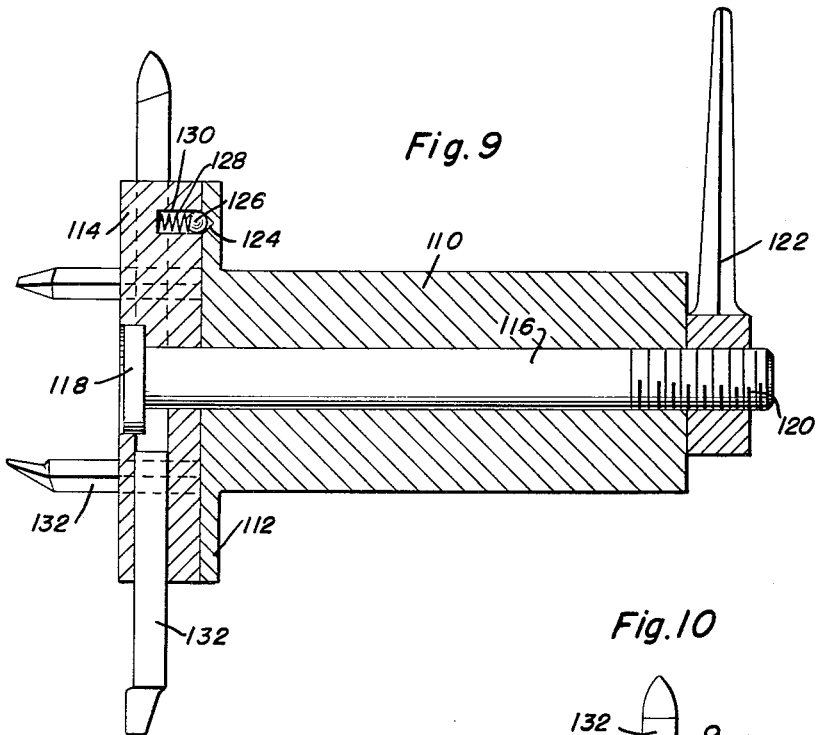
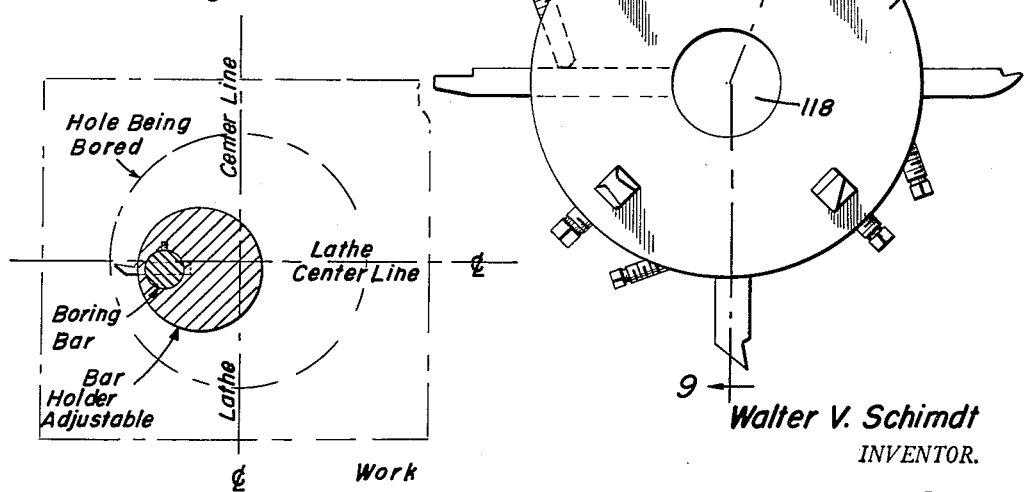

May 15, 1956   W. V. SCHMIDT   2,745,306
ADJUSTABLE TOOL HOLDER
Filed April 26, 1951   5 Sheets—Sheet 5

Walter V. Schmidt
INVENTOR.

United States Patent Office 2,745,306
Patented May 15, 1956

2,745,306

ADJUSTABLE TOOL HOLDER

Walter V. Schmidt, Highland Falls, N. Y.

Application April 26, 1951, Serial No. 222,996

2 Claims. (Cl. 82—36)

This invention comprises novel and useful improvements in an adjustable tool holder and more specifically pertains to a tool holder adapted for attachment to the compound of a lathe for supporting tools in a manner to facilitate the adjustment thereof.

The present invention relates chiefly to an adjustable tool holder particularly adapted for supporting adjustable boring bar holders or the like, a lathe tool holder and other attachments for lathes.

The primary and general objects of this invention are to provide a new and useful tool holder which will greatly increase the adjustability of tools; greatly simplify the adjustment, sharpening and maintenance of tools; and will facilitate the obtaining of maximum performance from various tools, especially of the high speed character with a minimum upkeep and a minimum time required for adjustment of the tools.

The growing use of high speed cutting tools for metal working in the lathes of commercial as well as private machine shops gives rise to particular problems with regard to the special techniques necessary in order to obtain the full advantages of numerous special tool steels, the criticality of the tool angles, cutting edges and grinding of the tools for optimum performance; the critical positioning of the tool relative to the work; the obtaining of the necessary rigidity of tool mounting in order that the tool operation shall be most efficient. The foregoing problems have given rise to a simplified construction of the tool holders, frequently necessitating a special tool holder particularly adapted for mounting a particular tool in a particular condition for use. This greatly increases the number of tool holders required if the lathe operator is to obtain the optimum performance from the tool.

Few commercially available boring bars are designed to obtain the maximum efficiency and performance of the particular cutting angles, tool steels and machine capacity when using the various modern high speed tools. Attempts to avoid the relatively large number of tool holders required to perform the large variety of cutting operations commonly encountered in machine shops, both commercial and private, have not been uniformly successful since the alteration of boring bars in order to adapt the same to a universal tool post or the like has been expensive, difficult, time consuming and frequently leaves the bar weakened at its critical points, resulting in a loss of the extended usefulness and flexibility of use of the tool holder. Moreover, the attempts to adapt a specialized tool holder to another or to a general use frequently gives rise to problems concerning the proper positioning of the tool point with reference to the center of the lathe, which position is not readily adjustable in conventional tool holders.

The present invention aims to overcome the foregoing difficulties and realize the optimum advantages of high speed tools by providing a tool holder which greatly increases the rigidity of the mounting of the tool thereby enabling the latter to perform a superior quality of work at high speed; and very greatly increases the adjustability of the tool holder enabling the same to perform the numerous operations required in lathe work with a minimum number of tools, and with ready adjustment to attain the optimum working conditions for that tool.

It is therefore a very important object of this invention to provide an adjustable tool holder which will greatly increase the rigidity of the mounting of the tool with a view to eliminating or minimizing vibration or chatter of the tool in use.

A further important object of the invention is to provide an improved tool holder which may be readily employed with conventional tool compounds of lathes and which will obtain the optimum adjustability of the tool to greatly increase the range of usefulness of the same.

Rigidity is attained in the present invention by reducing the number of parts to a minimum thereby reducing relative movement between these parts; greatly minimizing the overhang of the tool, thereby reducing vibration and providing greater rigidity.

The present invention also enables the user to remove the bushing carrying the tool without disturbing the tool setting of the device; or to remove the entire tool assembly without disturbing either the tool setting or the bushing setting of the same.

Arising from the greatly increased adjustability of a tool carried by the present tool holder, are the advantages of the necessity for fewer tools by the operator since a very accurate adjustment and a variety of adjustments can be obtained for any given tool; reducing the time and expenses involved for tool grinding and so forth since the range of adjustment fits a tool to be employed more satisfactorily for a longer period of time; reduces tool expenses since fewer tools are required and less servicing operations are necessary; simplifies tooling and tool sharpening since the scope of adjustment permits the use of fewer tools and therefore simplified or reduced number of formulae; and enables the most effective tool positioning for any given tool.

These, together with various ancillary features and objects of the invention, which will later become apparent as the following description proceeds, are attained by the present invention, preferred embodiments of which have been illustrated, by way of example, in the accompanying drawings, wherein:

Figure 3 is a vertical central longitudinal sectional view, taken substantially upon the plane indicated by the section line 3—3 of Figure 1 of the tool holder shown therein, an alternative position in the adjustment of the holder being indicated in dotted lines therein;

Figure 4 is a vertical transverse sectional view, taken substantially upon the plane indicated by the section line 4—4 of Figure 5 and showing the manner in which a machine is secured in a modified form of tool holder, this bushing and securing means being likewise employed in the embodiment of Figures 1–3;

Figure 5 is a view similar to Figure 3 but in a modified form of tool holder which is of greatly simplified construction;

Figure 6 is a perspective view of a modified form of tool supporting bushing from the bushing shown in Figures 3–5;

Figure 7 is an end view taken from the right end of Figure 6;

Figure 8 is a fragmentary perspective view similar to Figure 1 but showing a slightly modified form of the device constituting a tool turret but operating upon the same principles as the form of Figures 1–3;

Figure 9 is a vertical central axial sectional view through the turret attachment of Figure 8, the same being taken substantially upon the plane indicated by the section line 9—9 of Figure 10;

Figure 10 is an end elevational view, taken from the left of Figure 9;

Figure 11 is a diagrammatic view illustrating the manner of positioning one form of tool for most effective operation;

Figure 1:
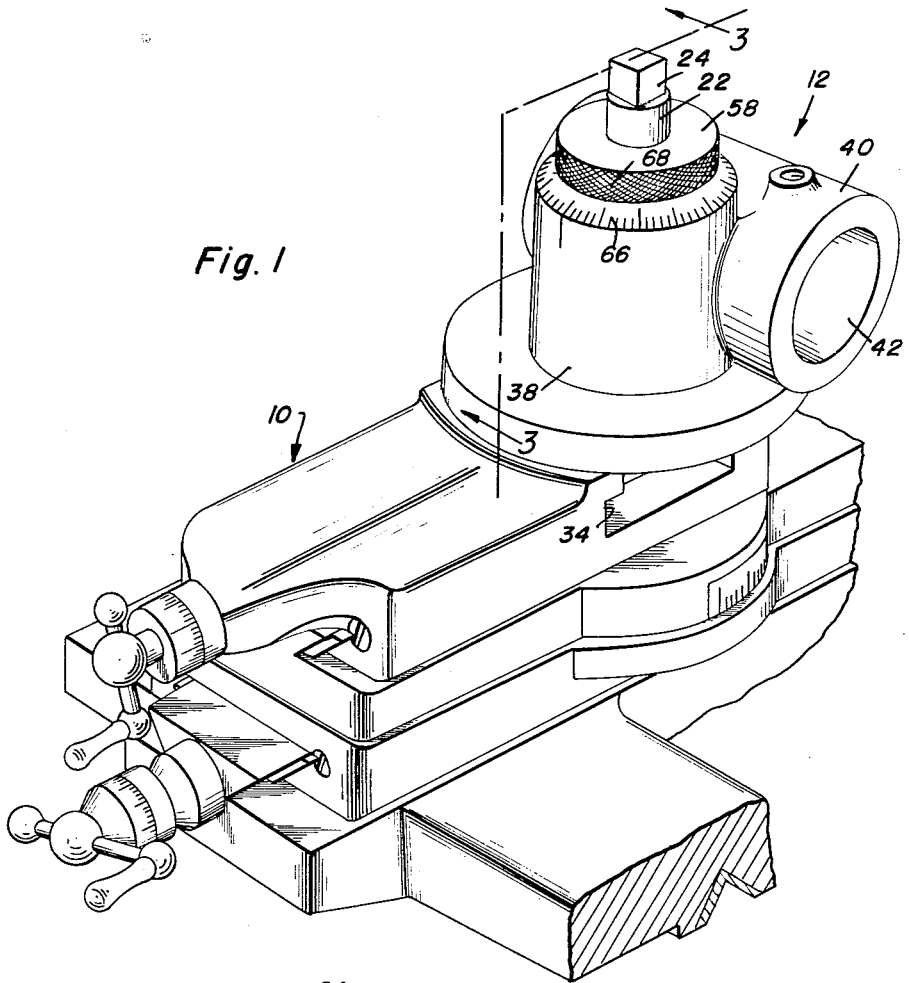
Figure 1 is a fragmentary view of a portion of a lathe compound or automatic tool feed showing the adjustable tool holder in accordance with this invention applied thereto.
Figure 2:
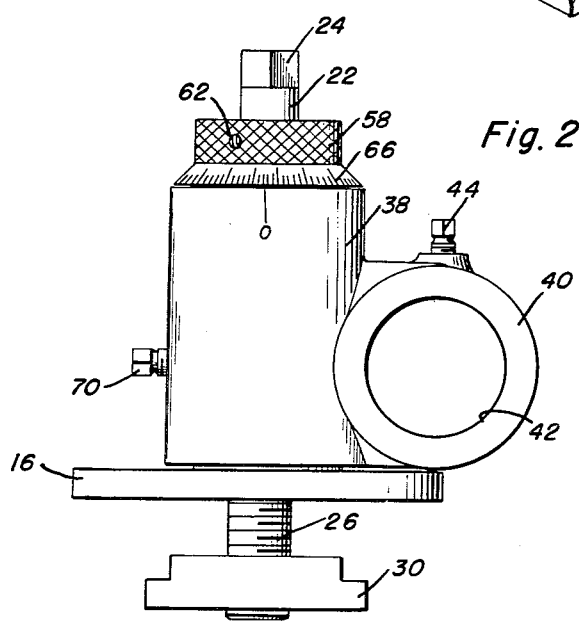
Figure 2 is an end elevational view of the adjustable tool holder shown in Figure 1 but removed from the lathe compound.

Referring now more specifically to the accompanying drawings, wherein like numerals designate similar parts throughout the various views, attention is directed first to the preferred embodiment of the invention as disclosed primarily in Figures 1–3 of the drawings, and wherein the numeral 10 designates generally a conventional form of lathe compound or automatic tool carriage with which the present invention may be expeditiously employed.

The improved adjustable tool holder forming the subject of this invention is indicated generally by the numeral 12, and as will be best apparent from Figure 3, consists of a base 14 having a suitable plate-like mounting flange 16 from which rises an upstanding internally threaded tubular bushing 18. The threads on this bushing are indicated by the numeral 20 and preferably extend throughout the entire inner surface of the bushing. The base 14 is adjustably secured to the tool compound 10 by means of a securing means consisting of a clamping bolt 22 whose upper end is polygonal shaped, as at 24, for the reception of an adjusting wrench or the like, and its lower end is screw-threaded, as at 26. Just above the screw threaded portion 26, the bolt is provided with an annular enlargement or collar 28 which is adapted to rest against the bottom wall in the bushing 18.

A conventional form of fastening nut 30 is screw threadedly engaged upon the portion 26 of the clamping bolt, this nut being provided with an annular shoulder 32 adapted to be engaged in the T-slot 34 of the tool compound 10. When the nut 30 is engaged in the T-slot 34, it will be evident that by rotation of the bolt 22, the collar 28 and the nut 30 will serve to tightly clamp the base plate 16 to the compound in laterally adjusted position thereon.

The tool holder of this invention includes a body indicated generally by the numeral 36 and which comprises a vertically disposed cylindrical bushing or sleeve 38 which is telescoped over the bushing 18 for vertical sliding movement. The body includes a cylindrical laterally and transversely extending boss or enlargement 40 having a cylindrical bore 42 therein, a pair of locking screws 44 being screw threaded through the enlargement 40 and into the fore for a purpose to be subsequently set forth.

Any desired number of the fastening screws 44 may be applied, and conveniently the construction may be as set forth in Figure 4 with two such screws 44 being disposed adjacent the opposite ends of the cylindrical boss 40 and into the bore 42 thereof for retaining a cylindrical bushing 46 constituting means for mounting in the bore different sizes and types of tools as set forth hereinafter.

The sleeve-like portion 38 of the body is snugly slidable upon the bushing 18 in guided relation, and may be either rotatable or non-rotatable thereon as preferred, but is capable of vertical guided sliding movement.

In the lowered position of the body relative to the base, the lower edge or surface of the bushing 38, as shown in full lines in Figure 3, may directly abut upon and rest upon the top surface of the plate 16 to provide a rigid, sturdy and secure support for the body when the latter is clamped to the tool compound.

At its upper end, the sleeve portion 38 is provided with an inturned annular flange 48 by means of which the body is secured to a body adjusting and mounting member. This mounting member comprises a bushing or sleeve 50 which is externally threaded throughout its external surface, as at 52, for adjustably engaging the screw threads 20 of the bushing 18, as provided with an axial bore 54 which snugly, rotatably and slidably is engaged upon the clamping bolt 22. Adjacent its upper end, the sleeve portion 50 is provided with an annular lateral flange 56 upon which is seated the inturned flange 48 of the body sleeve portion 38. A clamping collar 58 is threaded upon the externally threaded upper portion 60 of the member 50 and the lower surface of this collar serves to clamp and frictionally engage the upper surface of the inturned flange 48 for clamping the latter against the flange 56 of the sleeve 50. A set screw or the like 62 may be employed to retain the collar 58 in this clamped position. The exterior surface of the collar may be beveled, as at 64, and provided with suitable indicia 66. By making the threads 52 and 20 of a requisite pitch, the body 36 may be raised or lowered by a predetermined definite amount for each revolution of the sleeve 50 which carries the body. To assist in such revolution, the surface of the collar 58 may be knurled, as at 68, to provide a convenient finger grip portion.

A further locking or set screw 70 may be provided in the sleeve portion 38 of the body for clamping engagement upon the exterior surface of the bushing 18 to lock the body in its vertically adjusted position.

As will be readily apparent from Figure 3, the upper end of the clamping bolt 22 extends above the adjusting collar 58 and the upper portion of the sleeve 50, for a sufficient distance to permit the entire assembly to be loosened or adjusted and removed from the tool compound 10 without altering the adjustment of the body 38 with respect to the bushing 18.

It should be particularly noted that when mounted in an adjusted position, as shown in Figure 3, the tool carried by the portion 40 is rigidly secured divergent with the relatively large area of the sliding concentric sleeve surfaces between the members 50, 18, 38 and the sliding engagement of the axial bore 54 of the member 50 upon the clamping bolt 22. Thus, extreme rigidity is imparted to the tool mounting to prevent unwanted flexing, lost motion or chattering of the tool.

It will further be seen that the device as described offers the advantages of a micrometric adjustment of the vertical positioning of the tool, in order to enable different tools and different tool holders to be adjusted into optimum cutting position with respect to the lathe center line, as shown diagrammatically in Figure 11.

Referring now more specifically to the bushing 46, it will be seen there is disclosed in Figure 4 this bushing as a relatively short leg, being but slightly longer than the cylindrical enlargement 40. It is contemplated that a plurality of bushings 46, all of the same uniform external diameter may be interchangeably employed in the single bore 42. Each of these bushings may have a single longitudinally extending bore which is preferably eccentrically mounted with respect to the axis of the bushing for receiving a boring bar or other tool therein. By this means, by rotating the bushing 46, the eccentrically mounted tool carrying socket of the bushing may be readily adjusted vertically as desired, in order to facilitate the proper vertical positioning of the tool with respect to the lathe line of centers.

However, preferably, as shown in Figure 3, the bushing 46 is provided with a plurality of eccentrically disposed, parallel and longitudinally extending bores or sockets 72, 74 and 76, each of which may be of a different diameter if desired, whereby a single bushing may be capable of interchangeable use with different sizes of tools and boring bars. Suitable set screws, as suggested by the dotted lines of Figure 5 at 78 and as shown in Figure 4, may be provided for adjustably retaining the tools or boring bars in these sockets.

As shown in Figure 5, a simplified version of the construction in Figure 3 is possible, in which a body 80 is provided with an axial bore 82 for sliding movement upon the clamping bolt 22, this body having the cylindrical transversely disposed boss 40 of the same construction previously described. However, the micrometric adjustment has been omitted from this embodiment, and the base portion 84 of the body 82 is adapted to directly rest upon the top surface of the tool compound 10 and to be clamped thereto as by the nut 30 upon the screw threaded portion 26, all as previously mentioned.

However, in place of the micrometric adjustment, the clamping bolt is provided with a screw threaded portion 86 at its upper end and a clamping nut 88 provided with a locking set screw 90 is provided upon this threaded portion to clamp the body 80 through the agency of a washer or spacer member 92. The operation of this construction is identical as regards to the adjustability of the bushing 46, but except through the interposition of adjusting washers between the base 84 and the tool compound 10 omits the micrometric adjustment of the embodiment of Figures 1–3.

Disclosed in Figures 6 and 7 is a modified construction of tool holder which may be employed in lieu of the bushing 46. As previously described, the bushing 46 is of relatively short length, being substantially of the same length as the cylindrical boss 40 upon the body. However, for certain specialized tool uses, the relatively larger cylindrical sleeve or bushing member 94 of Figure 6 may be employed, the same having an eccentrically disposed longitudinally extending bore 96 constituting a socket for receiving a boring bar or other tool 98 therein. Adjacent its extremity, the member 94 may be provided with an inclined surface 100 and a retaining set screw 102 may be disposed therethrough, in conjunction with any other set screw means desired, as at 104, for securely but adjustably and removably retaining the tool 98 in the bore 96. The relatively long body 94 serves to reinforce and support and give rigidity to the tool member 98 during its use. To facilitate rotational adjustment of the member 94 in order to utilize the eccentric effect of the same in vertically positioning the tool member 98, the member 94 at one end is provided with a band or ring 104 removably secured thereto, as by a set screw 106, and which ring is preferably provided with indicia 108 which will facilitate the proper positioning of the member 98. Similarly, this annular ring may be utilized with the constructions of Figures 3 and 5 as indicated in Figure 4.

In place of the bushing holders 46 or 94, or in conjunction therewith, may be employed a turret holder as disclosed in Figures 8–10. This type of holder is especially useful for mounting a plurality of carbide cutting points for selective use in different cutting operations. This type of holder consists of a cylindrical member 110 which may be of sufficient diameter to be received in the bores 42 of Figure 1 or 5 or in Figure 8; or if desired could be of sufficient diameter to be received within one of the sockets or recesses 72, 74, or 76 of the bushings 44; or may even be received in an eccentric bushing mounted in the boss 40 of Figures 3, 5 and 8. In any event, the cylindrical member 110 constitutes means whereby the turret construction is detachably and adjustably mounted in the adjustable tool holder of this invention.

At one extremity, the member 110 is provided with an integral annular flange 112 disposed perpendicular to the axis of the member 110. Secured against this flange is a disk 114 constituting a turret, this disk being removably and rotatably mounted upon the flange 110 by the fastening bolt 116 having a head 118 embedded in the turret disk and having a screw threaded extremity 120 having a locking handle 122. If desired, the face of the disk 112 may be provided with recesses 124 for the reception of locking bolts 126 which are yieldingly urged by springs 128 mounted in recesses 130 in the turret disk 114. The arrangement is such that the bolts and their locking recesses facilitate registry of the turret disk with the flange 112 so as to selectively position cutters carried by the turret for operative engagement with the work.

As shown in Figures 9 and 10, a plurality of cutters 132 are disposed in suitable sockets or recesses upon the periphery and upon the end face of the turret disk 114 and are removably secured as by set screws 134. It is contemplated that a plurality of types of cutters for inside right and left hand cutting, external cutting and cut off and machining tools may be employed. This construction offers the user the convenience of a turret lathe in the form of an attachment combined with the various novel features of adjustment hereinbefore set forth of this invention.

Figure 12:
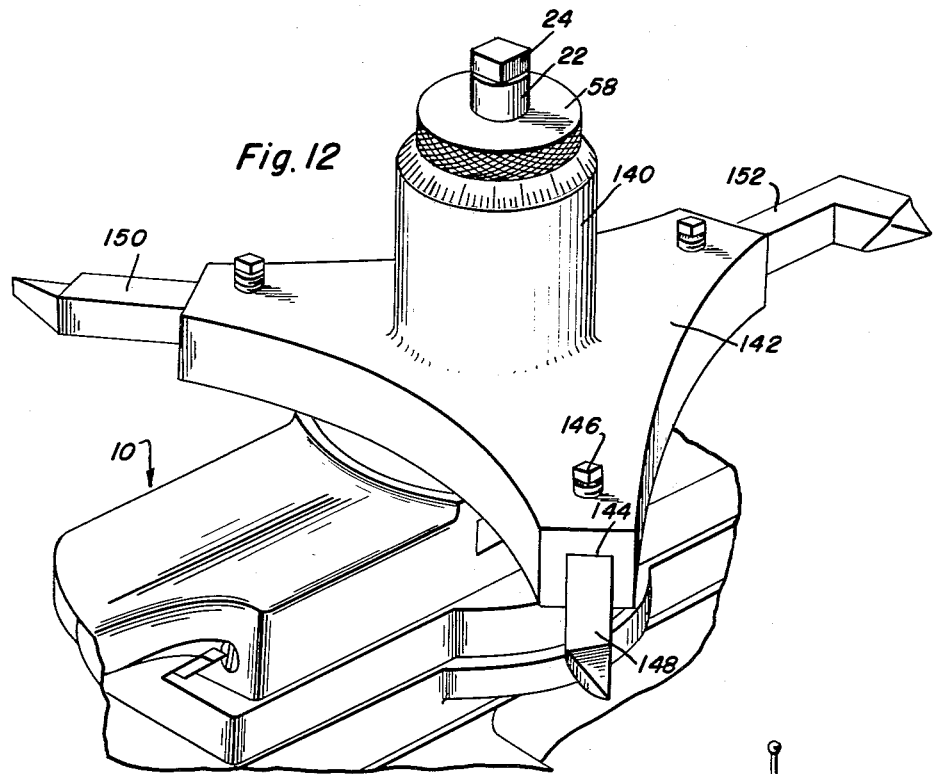
Figure 12 is a perspective view similar to Fig. 1, but showing still another modified form of turret mounting in accordance with this invention.

Referring now to the embodiment of Figure 12, there is shown a somewhat modified form of a turret lathe tool holder combined with the adjustable holder of Figures 1–3. In this embodiment the holder consists of an upstanding cylindrical body portion 140 corresponding in construction and operation to the member 38, and having the same internal construction together with the clamping bolt 22 having the shoulder portion 24 and together with the adjusting collar 58. The member 140 is provided with a plate-like base portion 142 which, however, is of a polygonal shape, that illustrated consisting of a triangular arrangement. Each of the apices of the triangular base 142 is provided with tool receiving sockets 144 together with fastening or set screws 146 by means of which various tool bits 148, 150 and 152 may be adjustably and removably secured in the turret member.

The construction illustrated possesses all of the advantages as to vertical micrometric adjustment of the form of Figures 1–3, but could likewise be constructed in the simplified form of Figure 5 if desired. In addition, this form of the invention possesses the advantages of a turret construction whereby plurality of tools are mounted for selective use without necessitating any adjustment of the tool assembly; or with a minimum adjustment in order to permit successive or sequential use of different tools upon the work.

Figure 13:
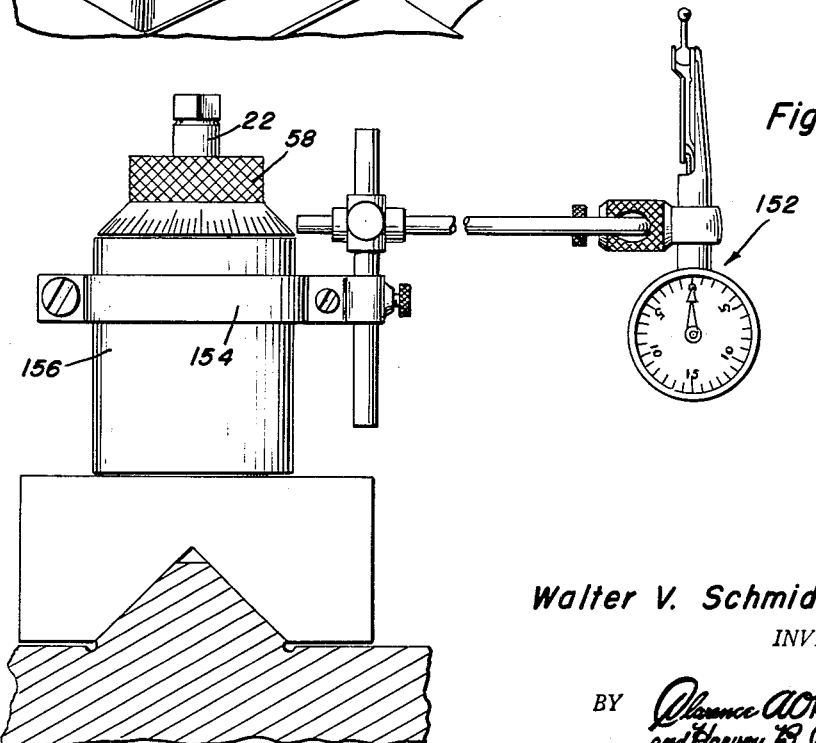
Figure 13 is an elevational view, parts being shown in section, of a scriber attachment which may be used with this invention.

Illustrated in Figure 13 is one manner in which a direct reading scriber indicated generally by the numeral 152 may be clamped, as by a supporting band 154, upon the barrel or bushing portion 156 of the adjustable tool holder. It is to be understood that the member 156 corresponds to the members 140 of Figure 12, member 38 of Figures 1–3 or member 80 of Figure 5.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having described the invention, what is claimed as new is:

1. A lathe tool holder comprising a base including an upstanding bushing, a clamping bolt disposed axially of said bushing for adjustably securing the same to the T slot of a lathe tool compound, a body slidably mounted upon said bushing, means for adjusting said body vertically of said bushing, said body having a transverse bore, a bushing rotatably and axially adjustable in said bore, said bushing having a plurality of eccentrically disposed parallel tool receiving sockets, said means including a sleeve disposed within said body.

2. A lathe tool holder comprising a base including an upstanding bushing, a clamping bolt disposed axially of said bushing for adjustably securing the same to the T slot of a lathe tool compound, a body slidably mounted upon said bushing, means for adjusting said body vertically of said bushing, said body having a transverse bore, a bushing rotatably and axially adjustable in said bore, said bushing having a plurality of eccentrically disposed parallel tool receiving sockets, said means including a sleeve disposed within said body and slidably and guidably embraces said clamping bolt.

References Cited in the file of this patent

UNITED STATES PATENTS

| | | |
|---|---|---|
| 36,479 | Pratt | Sept. 16, 1862 |
| 60,114 | Ammidown | Dec. 4, 1866 |
| 195,769 | Weasham | Oct. 2, 1877 |
| 409,484 | Myers | Aug. 20, 1889 |
| 416,644 | Ramsey | Dec. 3, 1889 |
| 455,466 | Back | July 7, 1891 |
| 643,713 | Converse | Feb. 20, 1900 |
| 903,501 | Prince | Nov. 10, 1908 |
| 905,648 | Chamberlin | Dec. 1, 1908 |
| 1,028,805 | Wood | June 4, 1912 |
| 1,506,034 | Swanson | Aug. 26, 1924 |
| 2,497,059 | Thomas | Feb. 7, 1950 |

FOREIGN PATENTS

| | | |
|---|---|---|
| 14,776 | Great Britain | July 18, 1899 |
| 290,086 | Great Britain | May 10, 1928 |